United States Patent [19]
Cortelli

[11] Patent Number: 5,197,642
[45] Date of Patent: Mar. 30, 1993

[54] FREIGHT STACKING SUPPORT APPARATUS

[76] Inventor: David P. Cortelli, 1036 East St. North, Suffield, Conn. 06078

[21] Appl. No.: 733,862

[22] Filed: Jul. 22, 1991

[51] Int. Cl.⁵ .............................................. B60R 11/00
[52] U.S. Cl. ...................................... 224/310; 224/314; 224/322; 224/42.45 R; 248/222.1; 248/264; 248/268; 410/106; 410/144
[58] Field of Search .............. 224/310, 309, 315, 322, 224/323, 314, 327, 42.42, 42.45 R, 42.45 A; 211/123, 105.1; 248/268, 264, 222.1; 410/106, 107, 108, 110, 101, 129, 140, 141, 143, 144, 145, 146, 147, 148

[56] References Cited

U.S. PATENT DOCUMENTS

| | | | |
|---|---|---|---|
| 767,741 | 8/1904 | Dittenheimer et al. | 248/268 |
| 898,138 | 9/1908 | Roberts | 248/264 |
| 905,142 | 12/1908 | Bond | 248/264 |
| 1,394,287 | 10/1921 | Denning | 211/123 |
| 2,420,161 | 5/1947 | Aldrich | 248/222.1 |
| 3,304,034 | 2/1967 | Jones | 248/268 |
| 3,698,760 | 10/1972 | Lane . | |
| 3,712,524 | 1/1973 | Ames, Sr. | 224/310 |
| 3,737,083 | 6/1973 | Lund | 224/324 |
| 4,389,067 | 6/1983 | Rubio | 224/310 |
| 4,630,990 | 12/1986 | Whiting | 414/462 |
| 4,938,403 | 7/1990 | Cortelli | 224/310 |

*Primary Examiner*—Linda J. Sholl
*Attorney, Agent, or Firm*—Donald S. Holland

[57] ABSTRACT

A freight stacking support apparatus is disclosed for supporting oversized freight above a tailgate of a pickup truck. The apparatus comprises a support beam, a securing bracket with a locking mechanism, a triggering button for activating the locking mechanism, and a receiving bracket, where the brackets are affixed to opposing top rear edges of the side walls of a pickup truck and the ends of the support beam are received in slots in the opposing brackets such that the support beam resides parallel to and above the tailgate. When the apparatus is in position, it allows the user to safely transport freight without damaging the tailgate. In addition, it permits user access to the contents of the pickup truck bed through the pivotable tailgate without lifting or removing the supported freight.

10 Claims, 2 Drawing Sheets

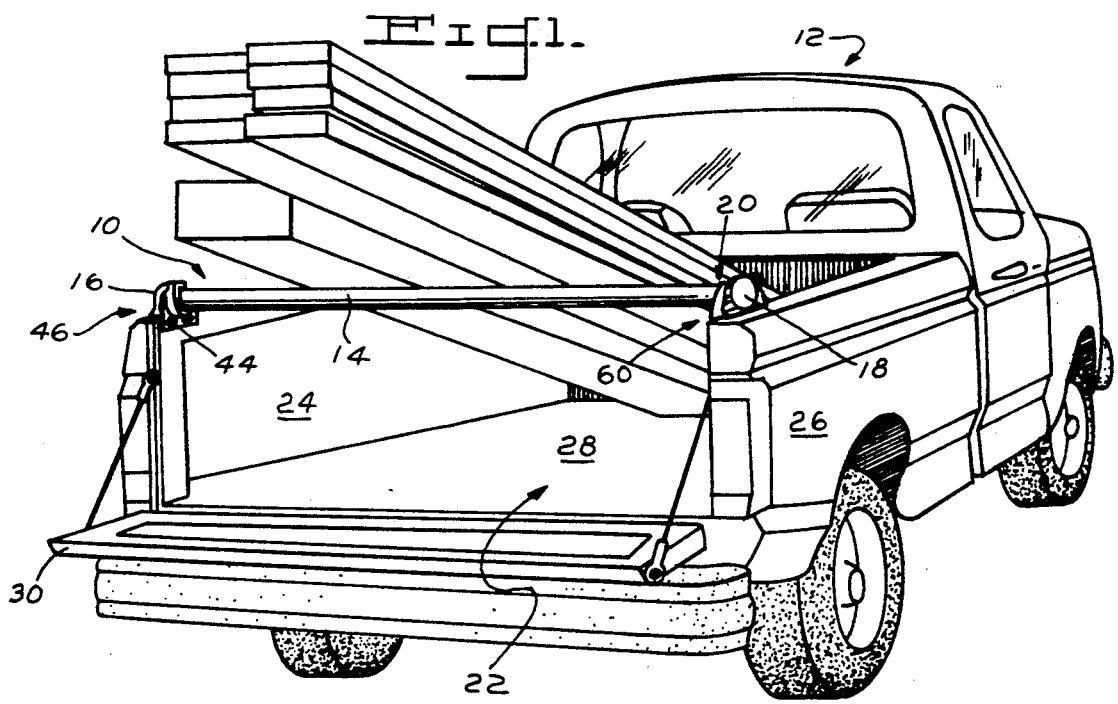
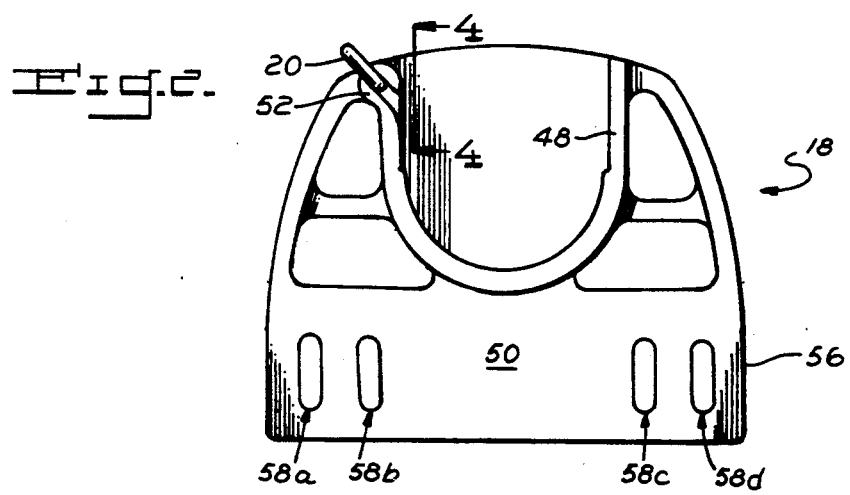
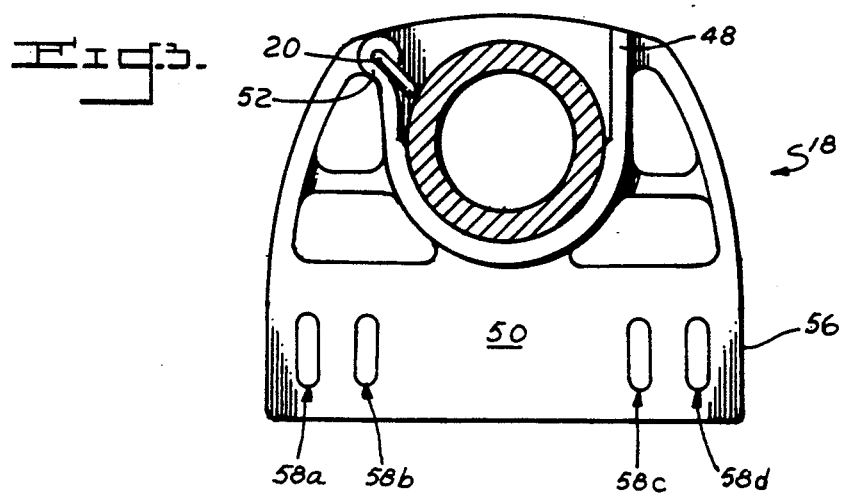

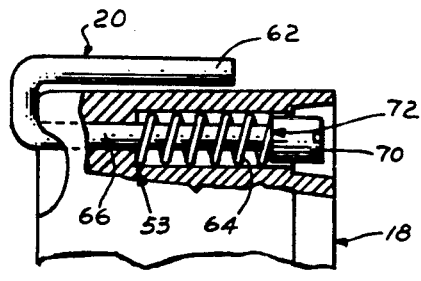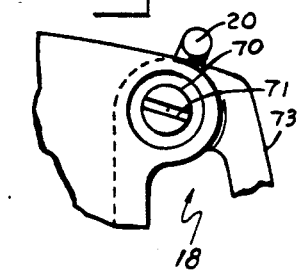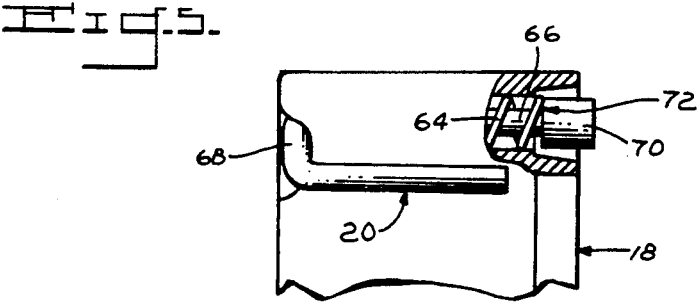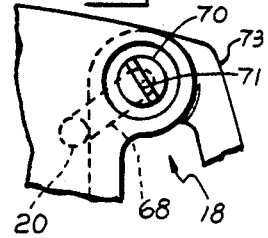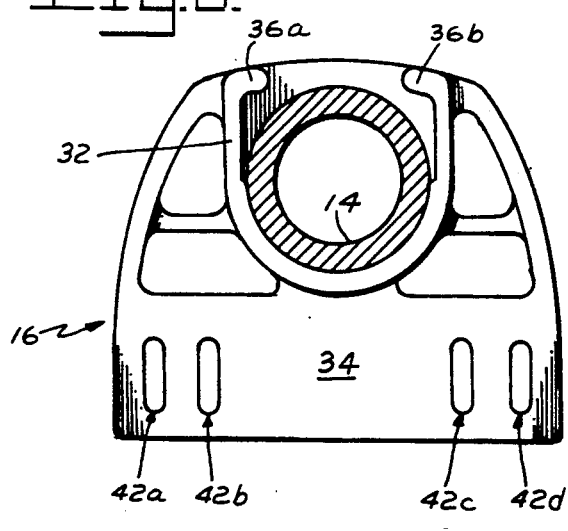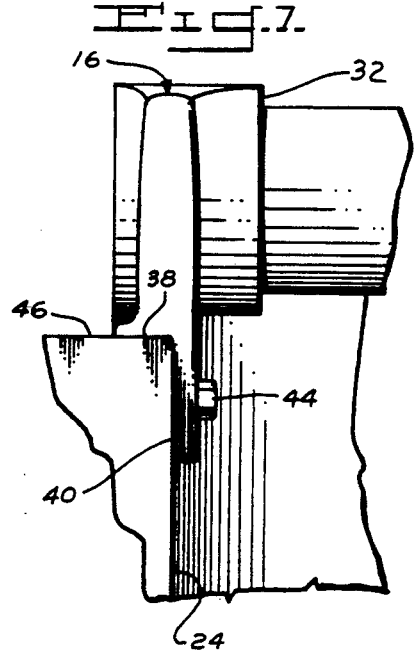

FREIGHT STACKING SUPPORT APPARATUS

BACKGROUND OF THE INVENTION

This application relates to U.S. Pat No. 4938403 to the present Applicant Cortelli, which issued Jul. 3, 1990.

The present invention, like that in U.S. Pat. No. 4938403, relates to devices for enhancing the durability and freight handling capacity of pickup trucks.

Pickup trucks are commonly used to transport small amounts of freight over short distances. A pickup truck bed, which holds the freight, is typically a rectangular box-like shape with an open top. A wall of the bed furthest from the truck's passenger compartment is referred to as a tailgate. It can be unlatched from the bed's side walls and pivoted downwardly from a vertical to a horizontal position.

When the tailgate is horizontal or "flat", freight can be easily loaded over it and onto the bed. When the tailgate is raised to its upright position and latched to the side walls, it secures the freight within the bed by preventing rearward movement as the truck is operated.

Occasionally, the pickup truck operator has to transport articles that are longer than the bed. Typical examples are canoes, rowboats, ladders, boards and other long or bulky items. Usually one end of such an article is placed in the bed, next to the passenger compartment. The other end protrudes beyond the tailgate. In order to prevent the article from sliding out of the bed, the gate is kept raised and a rear portion of the article rests on top of it. This arrangement causes the article to rest in an angular alignment, with its center of gravity well within the truck's bed. Consequently, the possibility of its sliding rearwardly, out of the truck, during transportation is significantly decreased.

Unfortunately, placing large articles on top of an upright tailgate causes problems. First, tailgates are not designed as weight bearing structures in that position. Because the articles of freight are not lying flat, a great deal of weight is brought to bear against the top edge of the tailgate. Persistent use of a tailgate in that manner causes excessive wear. Second, when freight is resting on an upright tailgate, the tailgate cannot be pivoted downward without great difficulty. Therefore, the volume of the bed between the freight and the floor of the bed cannot be efficiently utilized. If additional freight were stored there, the article resting on the tailgate's top edge would have to be removed to allow the tailgate to pivot open in order to gain access to that freight.

Devices have been developed that afford protection to the top edge of the tailgate when it is used to support freight. Most of these devices, however, are designed to be affixed to the tailgate. Therefore, they do not allow the tailgate to be opened and closed without moving the supported freight. Additionally, many of these devices are of a semi-permanent nature, utilizing bolts and nuts for securing a support member that transverses the top edge of the tailgate. They do not afford rapid assembly and disassembly for temporary use during transportation of oversized freight. Therefore, they remain in place, subject to wear and accidental disassembly during normal pickup truck use.

Accordingly, it is the primary object of the present invention to provide a freight stacking support apparatus which supports oversized freight above a tailgate of a pickup truck, so that the tailgate can be opened or closed without lifting the supported freight.

It is a general object to provide a freight stacking support apparatus that may be easily and rapidly assembled for supporting oversized freight above a tailgate of a pickup truck and which can be readily disassembled.

It is a more specific object to provide a freight stacking support apparatus with a simple locking mechanism, which permits a support beam to be easily secured or released, in seconds.

It is a further object to provide an apparatus which is extremely economical in design, yet safe and efficient.

SUMMARY OF THE INVENTION

An apparatus is disclosed for supporting oversized freight above a tailgate of a pickup truck, while affording normal utilization of the tailgate.

In the preferred embodiment, the invention comprises a support beam and two brackets for receiving and securing the support beam that are affixed to opposing top rear edges of the side walls of a pickup truck bed. To deploy the freight stacking support apparatus, the user first affixes one bracket to each side wall of the pickup truck. One of the brackets has a locking mechanism that must be released before use. With the locking mechanism released, the support beam may be easily and quickly inserted into the brackets. When properly inserted, the support beam resides parallel to and above the tailgate. After placing the support beam into the brackets, the locking mechanism is activated. The locking mechanism prevents the beam from moving up and out of the bracket should the pickup truck encounter a bump in the roadway. Although there is no locking mechanism on the other bracket, one is not needed because of the bracket's structure. The support beam is kept in place because it resides in a slot which is sufficiently enclosed to keep the beam in place.

To disassemble the freight stacking support apparatus, the user simply releases the locking mechanism, by depressing an operating button, and lifts the support beam up and out of that bracket. Then, the beam can be readily removed from the other bracket.

The above and other objects and advantages of this invention will become more readily apparent when the following description is read in conjunction with the accompanying drawings.

BRIEF DESCRIPTION OF THE DRAWINGS

FIG. 1 is a rear perspective view of a freight stacking support apparatus constructed in accordance with the present invention, showing the apparatus in place on a typical pickup truck;

FIG. 2 is an end plan view of one bracket, showing a locking mechanism in a released position, as it is used when ready to receive a support beam;

FIG. 3 is a similar plan view of the FIG. 2 bracket, but showing the locking mechanism in an activated position, as it is used to prevent the support beam from moving up and out of the bracket;

FIG. 4 is an enlarged side view taken along line 4—4 of FIG. 2, with portions broken away, showing the details of the locking mechanism in a released position;

FIG. 4A is a fragmentary end view, taken along line 4A—4A of FIG. 4, showing an operating button in the released position;

FIG. 5 is an enlarged side view similar to that in FIG. 4 showing the locking mechanism in an activated position;

FIG. 5A is a fragmentary end view, taken along line 5A—5A of FIG. 5, showing the operating button in the activated position;

FIG. 6 is an end plan view of the FIG. 1 bracket opposite the one containing the locking mechanism; and FIG. 7 is a side plan view of the FIG. 6 bracket, showing the bracket affixed to the side wall of a typical pickup truck.

DETAILED DESCRIPTION OF THE PREFERRED EMBODIMENTS

Referring to the drawings in detail, a preferred embodiment of the freight stacking support apparatus is shown and generally designated by the reference numeral 10. As best shown in FIG. 1, the invention 10 is affixed to a typical pickup truck 12. The invention comprises a support beam 14; a receiving bracket 16 for receiving and securing one end of the support beam 14; and a securing bracket 18 with a locking mechanism 20 for receiving and releasably securing the other end of the support beam 14.

Referring to FIG. 1, a typical pickup truck 12 has a freight supporting bed 22 that includes two parallel, vertical opposing side walls 24, 26 with a floor 28 between them. Adjacent to the floor 28 and interconnecting the two side walls 24, 26 is a tailgate 30. The tailgate 30 pivots from an upright or vertical position to a horizontal or "flat" position.

As best shown in FIGS. 6 and 7, the receiving bracket 16 includes an arcuate portion 32 and a mounting base 34. The arcuate portion 32 extends upwardly to form two virtually horizontal prongs 36a, 36b which prevent upward movement of the support beam 14. The mounting base 34 has a step 38 and a depending lip 40. The lip 40 has bolt slots 42a, 42b, 42c, 42d which receive securing bolts (e.g., 44) to affix the receiving bracket 16 to the side wall 24.

FIG. 7 shows how either the receiving bracket 16 or the securing bracket 18 is affixed to side wall 24 or 26 respectively. Both brackets are attached in the same manner. For ease of reference, only the receiving bracket 16 is displayed and discussed. As shown in FIGS. 1 and 7, the receiving bracket 16 is set on an upper, rear edge of the driver's side wall 46 near the tailgate 30. The receiving bracket 16 is then affixed to the side wall 24, via securing bolts inserted through the bolt slots 42a, 42b, 42c, 42d. Once in position, the arcuate portion 32 of the receiving bracket 16 faces the side wall 26.

As best shown in FIGS. 1-3, the securing bracket 18 is comprised of an arcuate portion 48; a mounting base 50; and a locking mechanism 20. The arcuate portion 48 has an end member 52 having a notched passage therethrough with a step 53 (see FIG. 4) for receiving the locking mechanism 20. The mounting base 50 is comprised of a step 54 (not shown) and a depending lip 56. The depending lip 56 has bolt slots 58a, 58b, 58c, 58d which receive securing bolts (not shown) to affix the securing bracket 18 to the side wall 26.

As best shown in FIG. 1, the securing bracket 18 is affixed to an upper, rear edge of the passenger's side wall 60, near the tailgate 30 in the same manner as the receiving bracket 16. Once in position, the arcuate portion 48 of the securing bracket 18 faces the arcuate portion 32 of the receiving bracket 16 affixed to side wall 24, and the locking mechanism 20 runs parallel to the support bar 14.

The locking mechanism 20 of the securing bracket 18, as best shown in FIGS. 4, 4A, 5 and 5A is comprised of a "J"-shaped rod 62 and a spring 64. The "J"-shaped rod 62 is comprised of a shaft member 66 and a hook member 68. The shaft member 66 has a triggering button 70 with a slot 71 at one end that provides a stop 72 for the spring 64 and which serves as a means to activate the locking mechanism 20. The slotted triggering button 70 is integrally attached to the shaft member 66 and extends slightly beyond a sidewall 73 of the securing bracket 18. The shaft member 66 is integrally connected to the hook member 68 at the other end. The spring 64 is positioned on the shaft member 66 of the "J"-shaped rod 62. The shaft member 66, with the spring 64 positioned thereon, is located inside the notched passage of the end member 52 of the arcuate portion 48 of the securing bracket 18.

The locking mechanism 20, once in position, is capable of being released by depressing the slotted triggering button, or operating button, 70, thereby causing the "J"-shaped rod 62 to advance forward beyond the confines of the notched portion of the notched passage of the end member 52 of the arcuate portion 48 and, additionally, causing the spring 64 to adopt a compressed configuration as dictated by the positions of the step 53 and the stop 72. The operating button 70 can be depressed by a user's finger. After the operating button 70 is depressed, the user can freely rotate the hook member 68 counterclockwise (using FIGS. 2 and 3 as the sightline reference), away from the arcuate portion 48. Compare also FIGS. 4 and 5, and FIGS. 4A and 5A. FIG. 4A shows the operating button 70 is a non-depressed position; thus, the locking mechanism 20 is in a released position. Conversely, FIG. 5A shows the depressed position of the operating button 70; consequently, the locking mechanism 20 is activated.

In operation, the user affixes the securing bracket 18 and the receiving bracket 16 to side walls 26 and 24, respectively.

With the locking mechanism 20 released, the user inserts one end of the support beam 14 into the receiving bracket 16. Then, the user inserts the other end of the support beam 14 into the securing bracket 18.

After the support beam has been positioned into the receiving and securing brackets 16, 18, the locking mechanism 20 is activated. This is done by rotating the hook member 68 clockwise towards the arcuate portion 48 of the securing bracket 18. Once the hook member 68 approaches the notched portion of the notched passage through the end member 52, the restorative force exerted by compressed spring 64 against the step 53 and the stop 72 causes the "J"-shaped rod 62 to retract inside the notched passage thereby causing the hook member 68 to become firmly seated in the confines defined by the notch. When the locking mechanism 20 is activated, the support beam 14 cannot rise up and out of the securing bracket 18. The support beam 14 is kept in place within the receiving bracket 16 by virtue of the horizontal prongs 36a, 36b located at the top of the arcuate portion 32.

Kindly note that, aside from the notched portion holding the "J"-shaped rod 62 in place, any upward pressure from the support beam tends to assist the effectiveness of locking mechanism 20. It pushes the rod's hook member 68 firmly against the nearby inside wall of bracket portion 48, thereby preventing any inadvertent or unwanted rotation of the locking mechanism to the released or de-activated mode.

Once the locking mechanism 20 is activated, the user may safely support large, bulky freight in his or her pickup truck. After the user reaches his or her destination, the tailgate 30 may be easily lowered without interfering with the placement of the freight (see FIG. 1). Once the freight is removed from the pickup truck 12, the freight stacking support apparatus 10 may be disassembled. This typically involves removing only the support beam 14, but could involve removing both the support beam 14 and the receiving and securing brackets 16, 18.

When transporting freight, the support beam 14 provides support for the freight where the tailgate 30 is not properly designed to do this. The support beam 14 prevents the freight from unduly damaging the tailgate 30 due to bumps or scratches and conversely prevents the tailgate 30 from damaging the freight. The freight may be further secured by wrapping a rope or other securing device around the freight and fastening it to the support beam 14. A rope would be impractical to use in conjunction with a tailgate 30.

After the user reaches his or her destination, the user can release the locking mechanism 20 by simply depressing the operating button 70 which causes the "J"-shaped rod to extend beyond the member 52 of the arcuate portion 48. In this position, the spring 64 is compressed. The locking mechanism 20 is then configured as shown in FIGS. 4, 4A and is ready to receive and secure another load of freight.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A freight stacking support apparatus for facilitating handling and transportation of freight in freight supporting beds of pickup trucks, said beds having two parallel, vertical, opposing side walls extending from a passenger compartment to a tailgate, said tailgate extending between and being pivotably mounted to ends of said side walls, said apparatus comprising:
   a. a support beam having a first end and a second end;
   b. a pair of first and second opposing brackets, which are adapted to be secured to side walls of said pickup truck adjacent said tailgate, wherein sad first opposing bracket includes an arcuate portion for receiving and releasably securing said first end of said support beam, and wherein said second opposing bracket includes an arcuate portion for receiving and securing said second end of said support beam, wherein said arcuate portions extend above said side walls and are in open-facing relationship when said first and second opposing brackets are secured to said opposing sidewalls of said pickup truck; and
   c. a locking means slidably and pivotally mounted to said arcuate portion of said first opposing bracket having a first released position and a second activated position, so the when said locking means is in said first released position said first end of said support beam can be freely inserted into or out of said arcuate portion of said first bracket, and when said locking means is in said second activated position said first end of said support beam is secured in said arcuate portion of said first bracket, whereby said locking means is activated by an operating button means for releasing and securing said locking means, wherein said operating button means comprises a free end of said spring-biased rod located in a throughbore, and wherein said free end is exposed through a face of said securing bracket for access by a user who is adjacent to the securing bracket.

2. The freight stacking support apparatus of claim 1 wherein said locking means is a biasing securing device.

3. The freight stacking support apparatus of claim 2 wherein said biasing securing device is comprised of a bias element and a "J"-shaped bar, wherein said bias element is positioned on said "J"-shaped bar.

4. The freight stacking support apparatus of claim 3 wherein said bias element is a spring.

5. A freight stacking support apparatus for facilitating handling and transportation of freight in freight supporting beds of pickup trucks, said beds having two parallel, vertical, opposing side walls extending from a passenger compartment to a tailgate, said tailgate extending between and being pivotally mounted to ends of said side walls, said apparatus comprising:
   a. a support beam having a first end and a second end;
   b. a securing bracket, which is adapted to be secured to one of said side walls of said pickup truck adjacent said tailgate, which includes an arcuate portion for receiving and releasably securing said first end of said support beam, wherein said arcuate portion has an end member with a notched, stepped passage therethrough;
   c. a receiving bracket, which is adapted to be secured to said opposing side wall of said pickup truck adjacent to said tailgate, and which includes an arcuate portion for receiving and securing said second end of said support beam;
   d. a locking mechanism slidably and pivotally mounted in said notched, stepped passage of said end member of said arcuate portion of said securing bracket, having a first released position and a second activated position, so that when said locking mechanism is in said first released position said first end of said support beam can be freely inserted into or out of said arcuate portion of said securing bracket and when said locking mechanism is in said second activated position said first end of said support beam is secured in said arcuate portion of said securing bracket, wherein said arcuate portion of said securing bracket and said arcuate portion of said receiving bracket extend above said opposing side walls and are in open-facing relationship when said brackets are secured to said opposing side walls of said pickup truck, whereby said locking mechanism is activated by an operating button means for releasing and securing said locking mechanism, wherein said operating button means comprises a free end of said spring-biased rod located in a throughbore, sand wherein said free end is exposed through a face of said securing bracket for access by a user who is adjacent to the securing bracket.

6. The freight stacking support apparatus of claim 5 wherein said locking mechanism is a biasing securing device.

7. The freight stacking support apparatus of claim 6 wherein said biasing securing device is comprised of a bias element and a "J"-shaped bar, wherein said bias element is positioned on said "J"-shaped bar.

8. The freight stacking support apparatus of claim 7 wherein said bias element is a spring.

9. A freight stacking support apparatus for facilitating handling and transportation of freight in freight supporting beds of pickup trucks, said beds having two parallel, vertical, opposing side walls extending from a passenger compartment to a tailgate, said tailgate extending between and being pivotally mounted to ends of said side walls, said apparatus comprising:
 a. a support beam having a first end and a second end;
 b. a securing bracket, for receiving and releasably securing said first end of said support beam, which comprises an arcuate portion and a mounting base, wherein said arcuate portion has an end member with a notched, stepped passage therethrough, wherein said mounting base is integrally attached to said arcuate portion and is adapted to be secured to one of said said walls of said pickup truck such that said arcuate portion extends above said side wall and faces said opposing side wall;
 c. a receiving bracket, for receiving and securing said second end of said support beam, which comprises an arcuate portion and a mounting base, wherein said arcuate portion extends upwardly to form two horizontal prongs, thereby preventing upward movement of said second end of said support beam, and wherein said mounting base is integrally attached to said arcuate portion and is adapted to be secured to said opposing side wall such that said arcuate portion extends above said side wall and is in open-facing relationship to said arcuate portion of said securing bracket; and
 d. a locking mechanism slidably and pivotally mounted in said notched, stepped passage of said end member of said arcuate portion of said securing bracket, having a first released position and a second activated position, so that when said locking mechanism is in said first released position said first end of said support beam can be freely inserted into or out of said arcuate portion of said securing bracket and when said locking mechanism is in said second activated position, said first end of said support beam is secured in said arcuate portion of said securing bracket, whereby said locking mechanism is activated by an operating button means for releasing and securing said locking mechanism, wherein said operating button means comprises a free end of said spring-biased rod located in a throughbore, and wherein said free end is exposed through a face of said securing bracket for access by a user who is adjacent to the securing bracket.

10. The freight stacking support apparatus of claim 9 wherein said locking mechanism is comprised of a "J"-shaped rod and a spring, wherein said "J"-shaped rod is comprised of a shaft member and a hook member, wherein said shaft member has a slotted triggering button at one end and is integrally connected to said hook member at the other end, wherein said spring is positioned on said shaft member of said "J"-shaped rod, and wherein said shaft member with said spring positioned thereon is located inside, and said hook member is located outside, said notched, stepped passage of said end member of said arcuate portion of said securing bracket, wherein said locking mechanism has a first released position and a second activated position, so that when said locking mechanism is in said activated position said hook member fits securely in said notched portion of said notched, stepped passage of said end member of said arcuate portion of said securing bracket, thereby securing in place said first end of said support beam, and so that when said locking mechanism is in said released position, said hook member is rotatable counterclockwise away from said notched portion of said notched, stepped passage of said end member of said arcuate portion of said securing bracket, thereby allowing movement of said first end of said support beam into or out of said arcuate portion of said securing bracket.

* * * * *